United States Patent
Garaas et al.

(10) Patent No.: US 9,678,499 B2
(45) Date of Patent: Jun. 13, 2017

(54) METHOD FOR CONTROLLING REDUNDANTLY ACTUATED MACHINES FOR CUTTING A PATTERN OF DISCONNECTED CONTOURS

(71) Applicant: Mitsubishi Electric Research Laboratories, Inc., Cambridge, MA (US)

(72) Inventors: Tyler Garaas, Brookline, MA (US); Sohrab Haghighat, Cambdirge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 371 days.

(21) Appl. No.: 14/338,454

(22) Filed: Jul. 23, 2014

(65) Prior Publication Data

US 2014/0330424 A1 Nov. 6, 2014

Related U.S. Application Data

(63) Continuation-in-part of application No. 13/535,266, filed on Jun. 27, 2012, now Pat. No. 9,104,192.

(51) Int. Cl.
*G06F 19/00* (2011.01)
*G05B 19/31* (2006.01)
(Continued)

(52) U.S. Cl.
CPC ....... *G05B 19/31* (2013.01); *G05B 19/40937* (2013.01); *G05B 19/4103* (2013.01);
(Continued)

(58) Field of Classification Search
CPC .......... G05B 19/31; G05B 2219/34112; G05B 2219/36119; G05B 2219/45051; G05B 19/19; G05B 2219/49372
See application file for complete search history.

(56) References Cited

U.S. PATENT DOCUMENTS

| | | | |
|---|---|---|---|
| 5,508,596 A * | 4/1996 | Olsen | G05B 19/237 318/569 |
| 6,609,044 B1 | 8/2003 | Basista et al. | |

(Continued)

FOREIGN PATENT DOCUMENTS

| | | |
|---|---|---|
| JP | H01124005 | 5/1989 |
| JP | 2001087876 | 4/2001 |

(Continued)

OTHER PUBLICATIONS

"Chapter 10—The Traveling Salesman Problem", University of Crete, 2014, printed from http://www.csd.uoc.gr/~hy583/papers/chltpdf.*

(Continued)

*Primary Examiner* — Michael D Masinick
(74) *Attorney, Agent, or Firm* — Gene Vinokur; James McAleenan; Hironori Tsukamoto

(57) ABSTRACT

A method controls a machine with redundant actuators according to pattern of disconnected contours, wherein the machine includes redundant actuators by first generating a set of initial trajectories from the pattern. Each initial trajectory corresponds to one of the disconnected contours, or a path from an exit point of one contour and an entry point of a next contour. A set of costs for the set of initial trajectories is determined. A sequence of final trajectories is determined based on the set of costs. Then, a set of commands is generated for controlling the machine according to the sequence of final trajectories.

20 Claims, 5 Drawing Sheets

(51) Int. Cl.
*G05B 19/4103* (2006.01)
*G05B 19/4093* (2006.01)

(52) U.S. Cl.
CPC ........... *G05B 2219/34112* (2013.01); *G05B 2219/35121* (2013.01); *G05B 2219/36199* (2013.01); *G05B 2219/40454* (2013.01); *G05B 2219/40463* (2013.01); *G05B 2219/45041* (2013.01); *G05B 2219/49365* (2013.01); *Y02P 90/265* (2015.11)

(56) References Cited

U.S. PATENT DOCUMENTS

| | | | | |
|---|---|---|---|---|
| 6,636,840 | B1 * | 10/2003 | Goray | G06N 99/005 706/11 |
| 7,469,620 | B2 | 12/2008 | Fagan | |
| 2002/0004687 | A1 | 1/2002 | Hunter et al. | |
| 2003/0018401 | A1 * | 1/2003 | Sorkin | G05B 19/188 700/31 |
| 2005/0071020 | A1 * | 3/2005 | Yamazaki | G05B 19/4086 700/56 |
| 2009/0082892 | A1 | 3/2009 | Tang et al. | |
| 2009/0288057 | A1 * | 11/2009 | Pirkle | G06F 17/5077 716/128 |
| 2011/0280372 | A1 * | 11/2011 | Ivanov | A61N 5/103 378/65 |
| 2012/0209512 | A1 * | 8/2012 | Kujirai | G01C 21/3423 701/428 |
| 2013/0190898 | A1 * | 7/2013 | Shilpiekandula | G05B 19/19 700/19 |
| 2014/0005804 | A1 * | 1/2014 | Brand | G05B 19/31 700/63 |
| 2014/0114463 | A1 * | 4/2014 | Shilpiekandula | G05B 19/19 700/173 |
| 2014/0330424 | A1 * | 11/2014 | Garaas | G05B 19/31 700/166 |
| 2015/0158121 | A1 * | 6/2015 | Di Cairano | B23K 26/0869 219/121.78 |

FOREIGN PATENT DOCUMENTS

| | | |
|---|---|---|
| JP | 2006053951 | 2/2006 |
| JP | 2006053951 A | 2/2006 |
| JP | 2006227701 | 8/2006 |
| JP | 2007172631 | 7/2007 |
| TW | 1507120 | 4/2004 |
| WO | 0188639 A2 | 11/2001 |
| WO | 2013108569 A1 | 7/2013 |
| WO | 2014002661 A1 | 1/2014 |
| WO | 2014002662 A1 | 1/2014 |

OTHER PUBLICATIONS

"Optimization Models of Tool Path Problems for CNC Sheet Metal Cutting Machines", Petunin et al, Ural Federal University, Russia, 2016.*

Jeffrey Hoeft, Udatta S. Palekar: "Heuristics for the plate-cutting traveling salesman problem", IIE Transactions, vol. 29, Sep. 1, 1997 (Sep. 1, 1997), pp. 719-731, XP008164274, DOI: http://dx.doi.org/10.1023/A:1018582320737.

Guk-can Han et al., "A Study on Torch Path Planning in Laser Cutting Processes Part 2: Culling Path Optimization Using Simulated Annealing," Journal of Manufacturing Processes, U.S. Society of Manufacturing Engineers, Jan. 1999, vol. 1, No. 1, 62-70.

Han G. C. et al. "A Study on Torch Path Planning in Laser Cutting Processes. Part 2: Cutting Path Optimization Using Simulated Annealing," Journal of Manufacturing Processes, Society of Manufacturing Engineers, Dearborn, MI, US. vol. 1, No. 1, Jan. 1, 1999.

Jeffrey Hoeft, Udatta S. Palekar. "Heuristics for the Plate-Cutting Traveling Salesman Problem," IIE Transactions, vol. 29. Sep. 1, 1997. p. 719-731.

Kenneth Castelino et al. "Toolpath optimization for minimizing airtime during machining," Journal of Manufacturing Systems. vol. 22, No. 3. Jan. 1, 2003. p. 173-180.

Rubinovita et al. "Task Level Off-line Programming System for Robotic Arc Welding—An Overview." Journal of Manufacturing Systems, No. 4, Dearborn MI, US. 1998. p. 293-305.

* cited by examiner

200

300

METHOD FOR CONTROLLING REDUNDANTLY ACTUATED MACHINES FOR CUTTING A PATTERN OF DISCONNECTED CONTOURS

RELATED APPLICATION

This U.S. Application is a continuation-in-part of U.S. application Ser. No. 13/535,266, "System and Method for Controlling Machines According to Pattern of Contours," filed by Brand, on Jul. 27, 2012, and incorporated herein by reference.

FIELD OF THE INVENTION

This invention relates generally to a method for controlling a redundantly actuated cutting machine, and more particularly to controlling the machine according to a pattern of disconnected contours.

BACKGROUND OF THE INVENTION

In computer numerically controlled (CNC) machining, a tool-head moves along a trajectory relative to a work-piece according to a pattern to machine a work-piece. The pattern can include straight, curved, open and closed contours. Of special interest to the invention are disconnected contours. The machining can include various types of processing of the work-piece, such as cutting or drilling the work-piece. For simplicity of explanation and without loss of the generality, the process of cutting the work-piece using a laser cutting machine.

Cutting features from sheet material according to the pattern is a common manufacturing process. Generally, a cutting head of a laser cutting machine is translated in a plane along, orthogonal axes. Laser cutters of this type are often used to cut discreet features from sheets of materials, e.g., plastic and metal sheets of varying thickness. Control of the laser cutter is usually performed by a computer numerical controller (CNC) following a prescribed set of instructions, e.g., implemented as "NC-code," or "G-code."

If the pattern to be cut includes disconnected contours) then the machining alternates with repositioning, e.g., after a cut the machine turns off the cutter, traverses a path to a new location, and turns the cutter on to continue the machining. Thus, as defined herein, a path is a special trajectory, usually straight, between two disconnected contours, while the cutter is off.

The trajectories of the machine are based on the pattern, e.g., a representation of all the contours to be cut. Some of the contours can be closed to represent a shape to be cut out of the material. The planning problem can determine a minimum-time or minimum-energy for all the cuts, among other formulations.

Until recently, all machining was characterized by stop-and-start motions. During the machining, the cutting head traverses along a path to an entry point of a contour of the pattern, stops, turns on the cutter, and then proceeds with the next contour. Consequently the fastest cut-to-cut traverse paths are straight lines. The planning problem for "stop-start" machining includes determining jointly an order of the cuts and the shortest straight traverse paths between the cuts.

However, the "stop-start" behavior of the laser cutter presumed by the trajectories limits the production rate of the machine. For high-speed machining, numerous accelerations and decelerations impose a high energy cost, and can wear out the machine.

Advances in cutting technologies uses "on-the-fly" cutting, that is, without stopping to turn the cutter on or off. This enables faster processing, but also poses a much more complicated planning problem, because straight traverses in on-the-fly machining can be suboptimal. However, substituting the straight traverses with other type of traverses can also be suboptimal, because that solution does not fully consider dynamical properties of the machine, see, e.g., U.S. Pat. No. 6,609,044. Other solutions involve hand-drawn trajectories, but obviously this is not a practical method for large planning problems.

A limiting factor on the production rate of an electromechanical machine, such as laser cutting machine, is directly related to the inertia of the mechanical components of the laser-cutting machine, e.g., the actuators. Therefore, reduction of the effective inertia of the components has a direct impact on the productivity of the laser-cutting machine. Such reduction can be achieved, in part, by using redundant actuators along each trajectory.

In the related U.S. application Ser. No. 13/535,266, a traveling salesman problem (TSP) is solved by determining a set of costs representing operations of a machine along a set of trajectories connecting a set of exit and entry points on contours of a pattern. Each trajectory represents an operation of the machine proceeding from an exit point with an exit velocity to an entry point with an entry velocity according to dynamics of the machine. The set of trajectories includes at least one trajectory representing the operation along a contour with non-zero velocities at corresponding exit and entry points, and at least one path representing the operation between different contours with non-zero velocities at the corresponding exit and entry points. A sequence of the trajectories optimizing a total cost of operation of the machine tracking the pattern is determined based on the costs, and a set of instructions for controlling the machine is determined according to the sequence.

SUMMARY OF THE INVENTION

It is the object of the embodiments of the invention to provide a system and method for controlling a machine according to a pattern of disconnected contours. For the purpose of describing the invention, a laser cutter is used as an example machine. However, it is understood, that the invention can also be worked with other types of machines.

The method generates trajectories, for on-the-fly machining, which include one or combination of a sequence of the trajectories with and without cutting, entry and exit points on the contours for the trajectories, dynamically optimal traverse paths between the exit and entry points of different disconnected contours, and a velocity profile for each trajectories.

In trajectory planning expressed as a traveling salesman problem (TSP), the disconnected contours representing cuts to be made by the machine are used to generate a set of initial trajectories with a potential starting and finishing position specified for each trajectory. The initial trajectories may not be in in an optimal sequence. The primary function of the initial trajectory generation is to determine a sequence of final trajectories that the machine can execute.

Many potential trajectories are possible. The TSP solution minimizes the cost of the trajectories based on some cost function, e.g., time or energy. Therefore, the cost of any trajectory should reflect a real-world quantity as accurately as possible to effectively optimize the TSP solver.

In one embodiment, the trajectory of the laser cutter is generated using the TSP with weights for each trajectory.

The weights are accurate estimates of the time required to follow a shortest path connecting two trajectories. For one example embodiment, a time-minimized version of the trajectory is described. However, it is understood real-world costs, other than time, associated with a trajectory for the machine can be minimized.

The embodiments to produce a time-minimal trajectory follow two primary steps. In the first step, a set of initial trajectories that cuts the entire pattern of disconnected contours is generated. Then, a set of costs are determined. The costs can be optimized to minimize, e.g., time, energy or jerk while machining the pattern. The optimized costs 316 are used to determine 330 a sequence of final trajectories 325, which determine a set of commands to machine the pattern.

The present invention expands the scope of our previous work described in U.S. application Ser. No. 13/535,266, publications 20140005804 and WO 2014002660. That system uses the TSP to formulate a method for generating a trajectory for a machine that is capable of on-the-fly cutting. That method determines a near-optimal trajectory for controlling a cutting machine according to pattern of disconnected contours.

However, that work did not cover redundant actuation, as it was not clear how to determine an estimated weight, e.g., for time or energy costs, for inclusion in the TSP. The difficulty of producing a good estimate is that the only information available for calculation is the starting and ending positions, and velocities of the cutting head of the machine. That was sufficient for a non-redundantly actuated machine, as the precise signals that must be supplied to each actuator can be determined deterministically from the positions and velocities alone.

However, redundantly actuated machines have many possible combinations of actuator state that can result in the laser head following a prescribed trajectory. As a result, the optimal signal for the actuators depends upon the previous cutting trajectories, as well as future cutting trajectories and paths, which are not known at the time of determining the TSP weights.

This invention describes solutions to computing weights for the TSP that give good TSP weights for computing the trajectories, and that minimize the time required to cut the pattern.

Additionally, methods that enable an optimization step of the TSP solver to generate accurate estimates of the time required for the redundantly actuated machine to perform a small portion of the trajectory are described. Unlike the estimates for the weights in the TSP, all trajectories, as well as future cuts and paths are known, which allows precise determination of the relative positions of the redundant actuators.

DETAILED DESCRIPTION OF THE PREFERRED EMBODIMENTS

Figure 1:
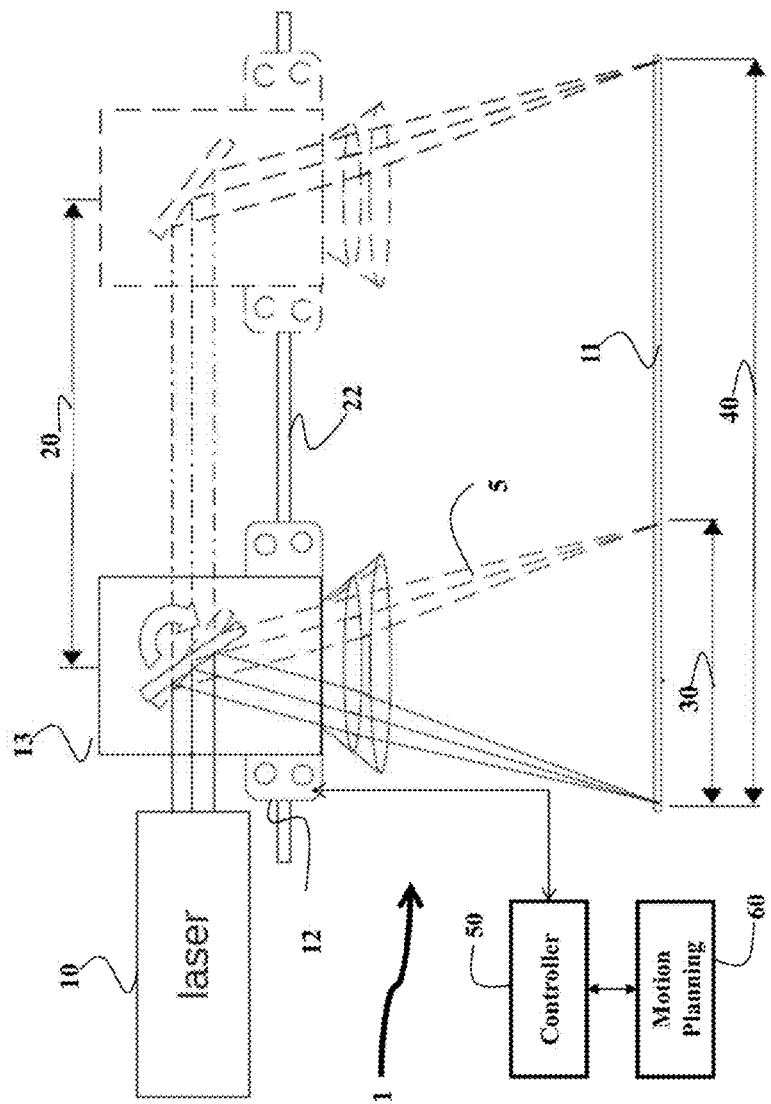
FIG. 1 is a schematic of a laser cutting machine with dual actuators that uses embodiments of the invention.

As shown in FIG. 1, an example laser cutting machines 1 allows "on-the-fly" cutting or other type of machining, that is without stopping to turn the cutter on or off. This enables faster processing, but also poses a much more complicated planning problem, because the straight traverses for such machine can be suboptimal. The laser cutting machine is suitable for controlling a position of a beam, produced by a laser 10 on a work-piece 11. The laser cutting machine includes redundant actuators, i.e., a first actuator and a second actuator, such that a laser beam travels along, a first direction 20. However, the principles of the invention can be employed by any type of redundant actuators.

The laser cutting machine includes a slow actuator, i.e., a platform 12 configured to move along the first direction 20. The platform is moved by a motion system 22 for moving the platform in a plane parallel to the work-piece. In one embodiment, the motion system 22 includes a first prismatic joint facilitating a first motion of the platform along the first direction 20.

The laser cutting machine also includes a fast actuator, i.e., a galvano mirror assembly 13 arranged on the platform 12, such that the motion of the platform along the first direction 20 causes a motion of the galvano mirror assembly along the first direction. The platform actuator is a slow actuator having high inertia. The galvano actuator is a fast actuator having low inertia.

For example, the motion of the platform is along the direction 20. Also, an operation of the galvano mirror assembly directs the laser beam to the work-piece along at least a second direction 30. The galvano mirror assembly is arranged on the platform such that the second direction is fixed with respect to the first direction 20, which allows directing the laser beam concurrently along the first direction and along the second direction. In various embodiments, the position of the laser beam on the work-piece can be approximated by a vector sum 40 of the first motion, and the second motion. The motion of the platform and the operation of the galvano mirror assembly are controlled by a controller 50. The control module 50 can be implemented using a processor connected to memory and input/output interfaces by buses as known in the art. The controller uses a motion planning module 60. The input to the controller is a numerical code, and the output is motion commands for the laser machine.

Figure 2:
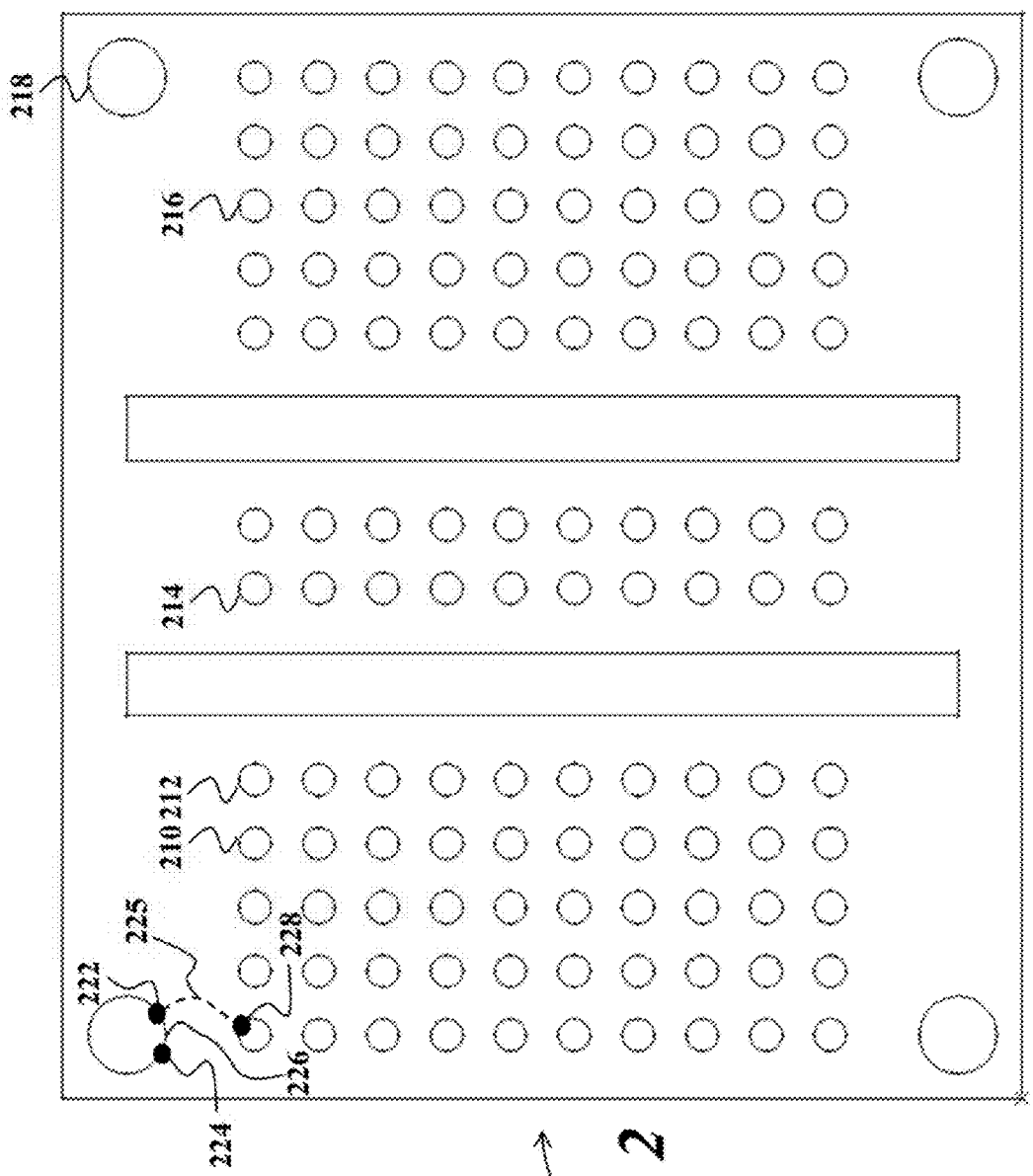
FIG. 2 is a schematic of an exemplar pattern of disconnected contours on which embodiments of the invention operate.

FIG. 2 shows an example pattern 200 of disconnected contours, such as the contours 210, 212, 214, 216, and 218, which can be used for cutting the material of the work-piece. Because the pattern includes the disconnected contours, the machining alternates with repositioning, e.g., after a cut the machine turns off the cutter, traverse to a new location along a path, i.e., a trajectory from one contour to the next, and then turn the cutter back on to continue the machining. Accordingly, cutting trajectories, i.e., the trajectories of cutting along the contour, such as contour 226, can alternate with traverse paths, i.e., the trajectory for repositioning the cutter to a new contour without cutting, such as the path 225.

End points of each trajectory are an exit point of starting the path from the contour and an entry point for entering the trajectory into the net contour. The endpoints are located on one of the contours of the pattern. Typically, the endpoints of the cutting trajectory are on the same contour, e.g., points 222 and 224 of the trajectory 226. However, the endpoints of the traverse paths are typically on different contours, e.g., points 222 and 228 of the trajectory 225. Each endpoint can be the exit point, the entry point, or both.

Figure 3A:
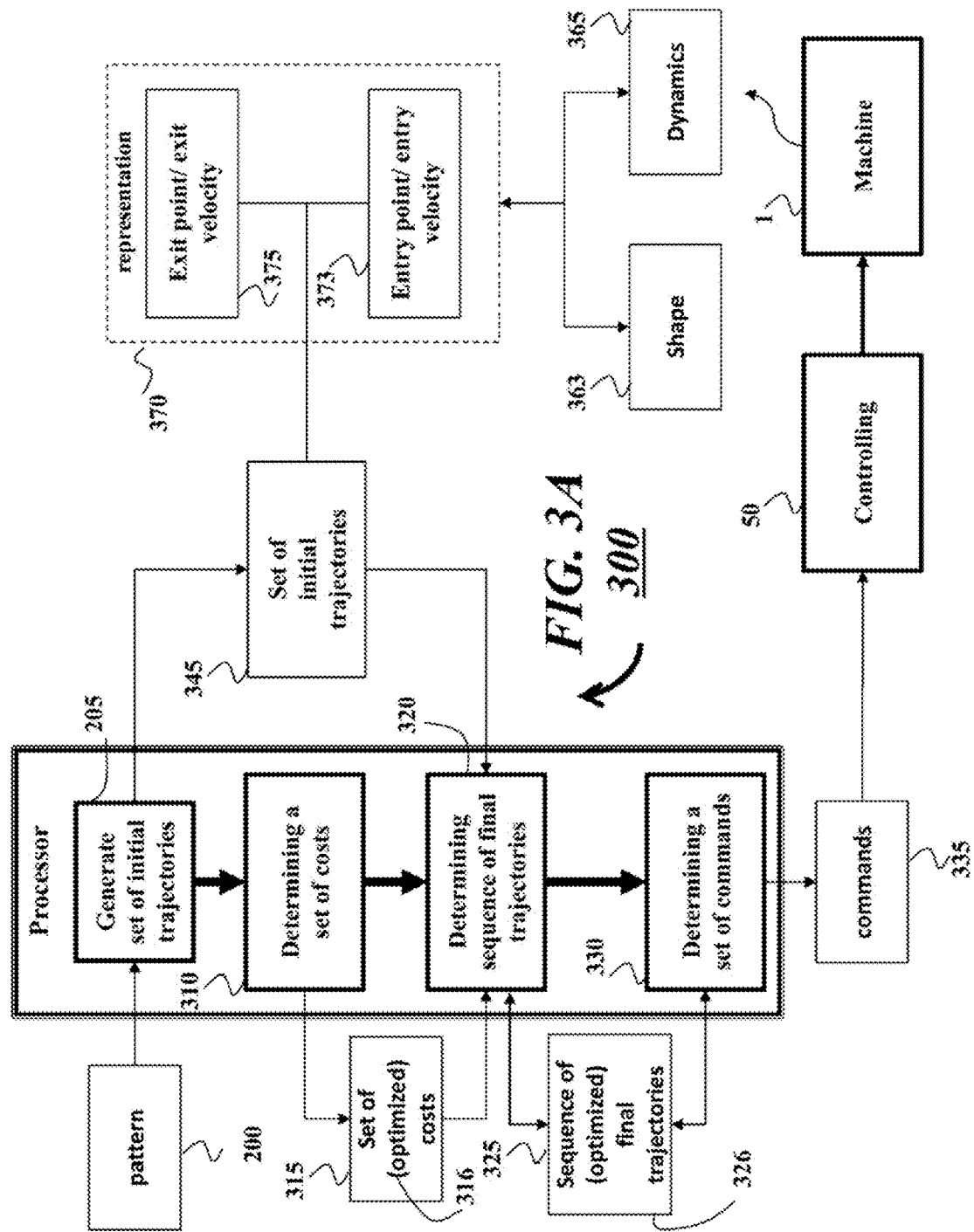
FIG. 3A is a flow chart of a method for controlling a machine according to a pattern of disconnected contours according to some embodiments of the invention.

FIG. 3A shows a system and method for controlling a machine according to a pattern of disconnected contours. A set of initial trajectories 345 is generated 205 from the pattern 200. Each initial trajectory corresponds to one of the disconnected contours in the pattern, or a path from an exit point of one contour and an entry point of a next contour. The initial trajectories may not be optimally sequenced. Therefore, a set of costs 315 is determined 310 for the set of initial trajectories. The costs can be optimized costs 316 as described in detail below.

The costs are used to determine 320 a sequence of final trajectories 325. The final trajectories can be optimized trajectories 326. The sequence of trajectories can be used to determine 330 a set of commands 335 for controlling 50 the machine 1.

The steps of the method can be performed in a processor 300 connected to memory and input/output interface by buses as known in the art.

A particular trajectory can represents 370 an operation of the machine proceeding from an exit point of one contour with an exit velocity 375 to an entry point of a next contour with an entry velocity 373 according to a shape 363 of the contour to be cut, and dynamics 365 of the machine 1. Typically, the set of initial trajectories includes at least one trajectory representing an operation along the contour with non-zero velocities at corresponding exit and entry points, e.g., the trajectory 226 of FIG. 2, and at least one trajectory representing the operation between different contours with non-zero velocities at the corresponding exit and entry points, e.g., the path 225 of FIG. 2.

Determining Costs

In redundant laser processing machines, the position of a laser spot along an X and Y axis is a function of the redundant actuators, e.g., fast and slow actuators:

$$x_{laser\ spot} = f_x(x_{fast}, x_{slow})$$

$$y_{laser\ spot} = f_y(y_{fast}, y_{slow})$$

In some embodiments, the relationship between the laser spot position and the positions of the fast and slow actuators can be approximated using a linear function.

As a result of this redundancy, cutting trajectories and traverse paths can be realized with a combination of positions of the fast and slow actuators. The motion planning procedure 60, i.e., the method 300, controls the two actuators in a way to minimize the time to move along the trajectories, while ensuring that all actuators remain within their operational and physical limits.

Figure 4:
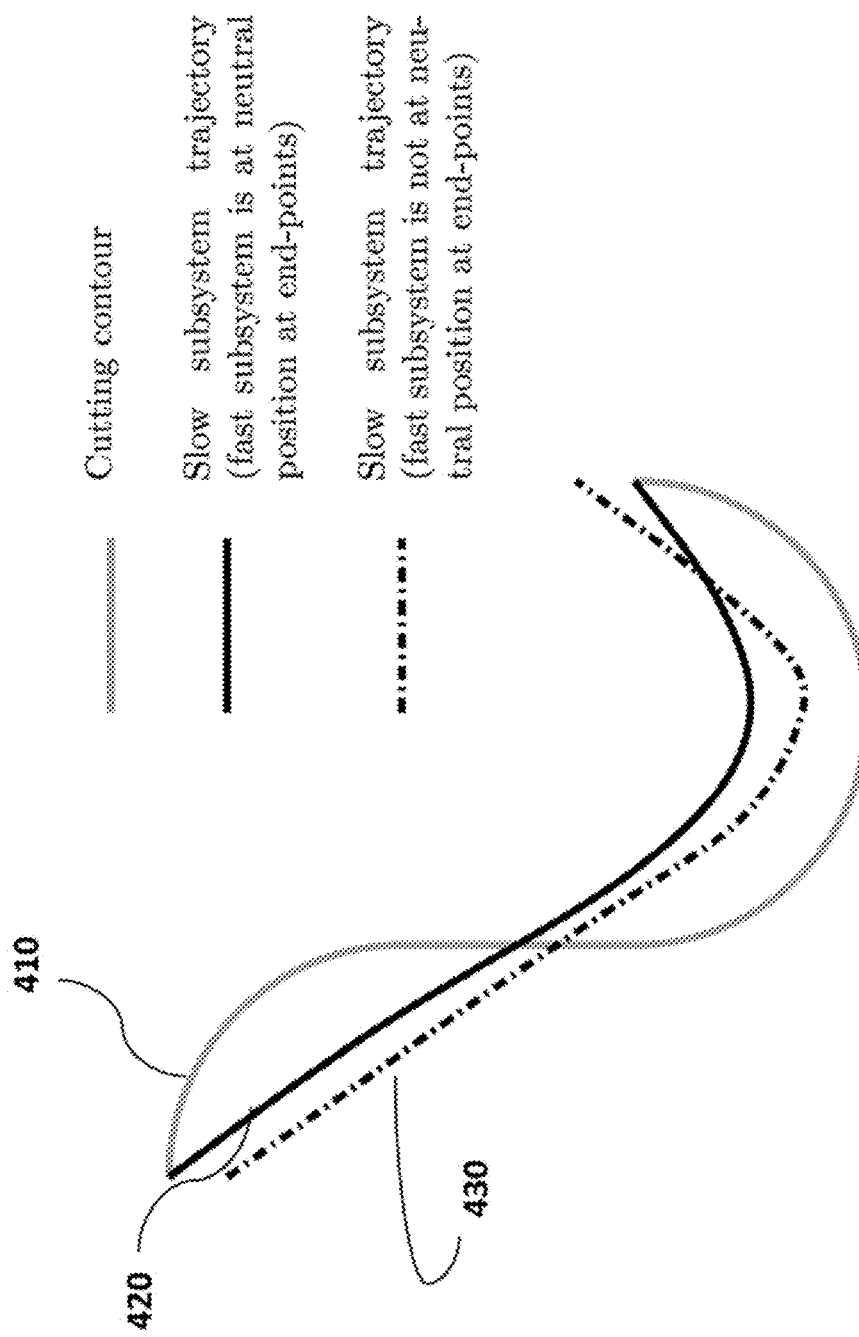
FIG. 4 is a schematic of moving time depending on the position of the fast and slow actuators at the beginning of the trajectory.

As shown in FIG. 4, the moving time depends on the position of the fast and slow actuators at the beginning of the trajectory. As shown in FIG. 4, slow actuator trajectories 420, 430 are both feasible trajectories, assuming that the difference between the cutting contour 410 and the slow actuator trajectory can be covered by the fast actuator. Both trajectories 420 and 430 represent the minimum-time solutions given the initial and final conditions.

In one embodiment, to determine the costs, it is assumed that the fast actuator is positioned at a neutral position at the beginning of each trajectory and the laser spot position is realized by the slow actuator (trajectory 420 in FIG. 4). This assumption removes the extra degrees of freedom in the system and allows us to determine the set of costs for different trajectories.

To ensure the validity of this assumption, a set of constraints is used in the trajectory generation unit, which requires the fast actuator to return to its neutral position at the end of each trajectory. This assumption may return, suboptimal costs, as the trajectory generator is limited to a set of possible trajectories where the fast actuator is forced to be located at its neutral position at the beginning and at the end of each trajectory. Therefore, the costs can be optimized when the entire trajectory is known.

In another embodiment, the optimized costs 316 can be determined according to an optimization operator, e.g., minimum, maximum, average, mean, etc. and combination thereof, applied to the costs 315.

For example, the system can determine relative positions of the actuators by considering a large set of possible past paths contained within a neighborhood of likely transition locations.

The embodiments can generate a set of possible costs related to making one particular transition path between two contours, and many possible computations can be applied to determine the cost actually used within the TSP graph. For example, an average of the potential times required to make the transition, or the minimal potential time required, among others. This embodiment of computing costs can produce a better trajectory, but also requires more time to determine than assuming the neutral position.

In one embodiment, the determination of the costs can be made more efficient by assuming that the traverse paths without cutting are generated by the slow actuator only. This assumption is based on the fact that the traverse path are generally smoother than the cutting trajectories, and the time associated with these paths are not significantly affected by only using the slow actuator. This can be considered in combination with any of the two above described embodiments, and it forces the machine to operate as a non-redundant laser cutting machine while moving along a traverse path.

The set of optimized costs 316 can be used to determine 320 the sequence of optimized trajectories 326, for example, by using a Christofides procedure, as is known in the art. The goal of the Christofides procedure is to find a solution to the instances of the traveling salesman problem where edge weights satisfy a triangle inequality.

Although the sequence of trajectories 325 defines an entire trajectory that is capable of cutting out the pattern, the sequence of trajectories is not likely to be an optimal entire trajectory that minimizes the time required to cut the pattern. As such, the sequence of trajectories 325 is optimized to improve the entire trajectory.

Optimize Sequence of Trajectories.

Figure 3B:
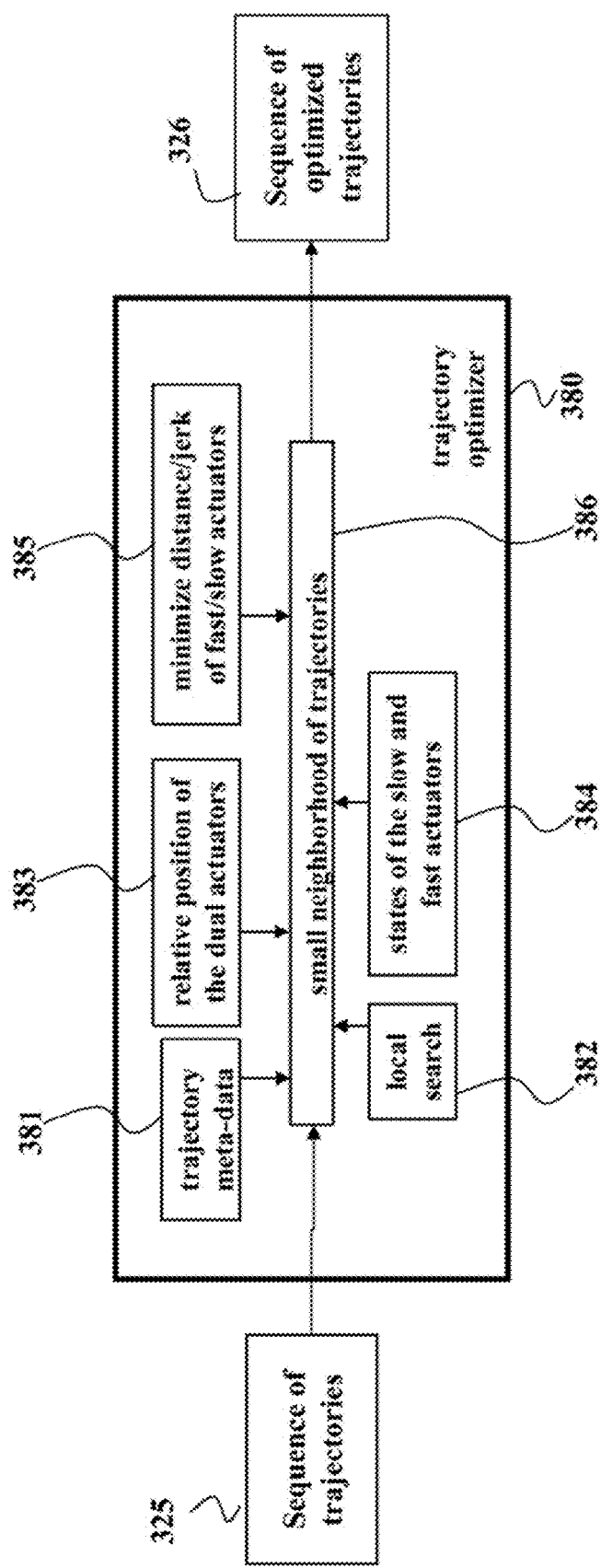
FIG. 3B is a flow chart of a procedure to optimize trajectories.

As shown in FIG. 3B, an optimization procedure 380 can change a current trajectory and determine when the change improves the current trajectory. If an improvement is made, then the change is applied, and the improved trajectory becomes an optimized trajectory 326.

Various alternatives to this optimization procedure allow for various trajectories or trajectory meta-data 381 to be stored during the optimization to allow back-tracking. Local search techniques 382 can also be applied.

The optimization procedure, unlike when optimizing the set of costs, is able to determine precisely an optimal relative position of the dual actuators 383, as the entire trajectory is known for both the current best trajectory as well as the trajectory with the considered change. As a result, it is no longer required to force the fast actuator to be located at its neutral position at the beginning of each trajectory, or to assume that the traverse paths are performed by the slow actuator only. This allows us to determine precisely an optimal trajectory for the redundantly actuated laser cutting machine including the relative positions of the actuators.

When performing the optimization, it is not usually necessary to re-evaluate the entire trajectory to determine the benefit of the current trajectory, as local changes often only affect the relative actuator positions for a limited neighborhood of motions. As such, information about the laser cutting machine state, e.g., the states of the slow and fast actuators 384, can be stored in a memory and used to determine the changes for only a small neighborhood of trajectories 386 around a proposed change to the current trajectory. If the change improves the current trajectory, then the current trajectory, including the updated state of the laser cutting machine in the memory is replaced.

In the embodiments described above, we formulate the system for optimizing the time required for a redundantly actuated system to execute part or all of a trajectory. Other embodiments that minimize or maximize other functions are also possible and covered under the embodiments. For example, one can minimize 385 a total traveling distance of the slow actuators, or minimize the jerk of the fast or slow actuators, among many other formulations.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling a machine according to pattern of disconnected contours, wherein the machine includes redundant actuators, comprising:
    generating a set of initial trajectories from the pattern, wherein each initial trajectory corresponds to one of the disconnected contours, or a path from an exit point of one contour and an entry point of a next contour;
    determining a set of costs for the set of initial trajectories, wherein the determining comprises generating a set of possible costs to make one path between two contours by considering multiple initial conditions for states of fast and slow actuators;
    determining a sequence of final trajectories based on the set of costs;
    determining a set of commands for controlling the machine according to the sequence of final trajectories, wherein the steps are performed in a processor.

2. The method of claim 1, wherein a particular trajectory represents an operation of the machine proceeding from the exit point with an exit velocity to an entry point with an entry velocity according to a shape of the contour to be cut, and dynamics of the machine.

3. The method of claim 1, wherein the set of initial trajectories includes at least one trajectory representing an operation of the machine along the contour with non-zero velocities at corresponding exit and entry points, and at least one trajectory representing the operation between different contours with non-zero velocities at the corresponding exit and/or entry points.

4. The method of claim 1, wherein the costs minimize a time to machine the pattern.

5. The method of claim 1, wherein the costs minimize an energy to machine the pattern.

6. The method of claim 1, wherein the costs minimize a jerk when machining the pattern.

7. The method of claim 1, wherein the costs are a weighted combination of an energy, a time, and a jerk when machining the pattern.

8. The method of claim 1, wherein the costs are determined according to an operator, wherein the operator includes a minimum, a maximum, an average, a mean or combinations thereof.

9. The method of claim 1, wherein the machine includes a slow and a fast actuator, and wherein the paths are generated only by the slow positioning subsystem.

10. The method of claim 1, further comprising:
    optimizing the set of final trajectories to obtain optimized trajectories.

11. The method of claim 10, wherein optimizing uses a Christofides procedure.

12. The method of claim 10, wherein the optimizing minimizes a total traveling distance of slow actuators.

13. The method of claim 1, wherein the set of costs are minimized by solving a traveling salesman problem.

14. The method of claim 1, wherein the set of costs are determined by ensuring a fast actuator starts at a neutral position.

15. The method of claim 1, wherein the set of costs are determined by ensuring a fast actuator starts and ends at a neutral position.

16. The method of claim 10, further comprising:
    storing states of the sequence of final trajectories in a memory; and
    optimizing a local neighborhood of the sequence of final trajectories.

17. A system for controlling a machine according to pattern of disconnected contours, comprising:
    a fast actuator and a slow actuator; and
    a processor for
        generating a set of initial trajectories from the pattern, wherein each initial trajectory corresponds to one of the disconnected contours, or a path from an exit point of one contour and an entry point of a next contour;
        determining a set of costs for the set of initial trajectories, wherein the set of costs are determined by ensuring a fast actuator starts at a neutral position;
        determining a sequence of final trajectories based on the set of costs; and
        determining a set of commands for controlling the machine according to the sequence of final trajectories.

18. A method for controlling a machine according to pattern of disconnected contours, wherein the machine includes redundant actuators, comprising:
    generating a set of initial trajectories from the pattern, wherein each initial trajectory corresponds to one of the disconnected contours, or a path from an exit point of one contour and an entry point of a next contour;
    determining a set of costs for the set of initial trajectories;
    determining a sequence of final trajectories based on the set of costs;
    determining a set of commands for controlling the machine according to the sequence of final trajectories, wherein the machine includes a slow and a fast actuator, and wherein the paths are generated only by the slow actuator, wherein the steps are performed in a processor.

19. A method for controlling a machine according to pattern of disconnected contours, wherein the machine includes redundant actuators, comprising:

generating a set of initial trajectories from the pattern, wherein each initial trajectory corresponds to one of the disconnected contours, or a path from an exit point of one contour and an entry point of a next contour;

determining a set of costs for the set of initial trajectories;

determining a sequence of final trajectories based on the set of costs;

optimizing the set of final trajectories to obtain optimized trajectories, wherein the optimizing minimizes a total traveling distance of slow actuators; and determining a set of commands for controlling the machine according to the sequence of optimized trajectories, wherein the steps are performed in a processor.

20. A method for controlling a machine according to pattern of disconnected contours, wherein the machine includes redundant actuators including a slow actuator and a fast actuator, comprising:

generating a set of initial trajectories from the pattern, wherein each initial trajectory corresponds to one of the disconnected contours, or a path from an exit point of one contour and an entry point of a next contour;

determining a set of costs for the set of initial trajectories ensuring the fast actuator starts and ends at a neutral position;

determining a sequence of final trajectories based on the set of costs; and determining a set of commands for controlling the machine according to the sequence of final trajectories, wherein the steps are performed in a processor.

* * * * *